United States Patent [19]
Hinze

[11] Patent Number: 5,597,201
[45] Date of Patent: Jan. 28, 1997

[54] EXTENDED CAB TRUCK STORAGE SEAT

[76] Inventor: Billy W. Hinze, Rte. 2, Box 118, Sedgewickville, Mo. 63781

[21] Appl. No.: 537,526

[22] Filed: Oct. 2, 1995

[51] Int. Cl.⁶ ................................................. A47C 7/62
[52] U.S. Cl. ................. 297/188.1; 224/540; 297/452.48
[58] Field of Search ............................ 296/37.16, 37.6, 296/37.15, 37.1; 224/540, 542, 543; 297/188.1, 188.09, 188.08, 188.01, 188.13, 452.48

[56] References Cited

U.S. PATENT DOCUMENTS

| | | | |
|---|---|---|---|
| 267,754 | 11/1882 | Mink | 297/188.1 |
| 1,404,484 | 1/1922 | Schoonmaker . | |
| 1,468,817 | 9/1923 | Jones | 297/188.13 X |
| 2,693,846 | 11/1954 | Luttio | 297/188.1 X |
| 2,722,352 | 11/1955 | Dehnel | 224/540 X |
| 2,725,923 | 12/1955 | Bachrach | 297/188.1 |
| 3,326,596 | 6/1967 | La Spina . | |
| 3,594,039 | 7/1971 | Harp | 297/188.1 X |
| 3,722,946 | 3/1973 | Cary | 224/543 X |
| 3,727,971 | 4/1973 | Sisler | 296/37.6 |
| 4,256,340 | 3/1981 | Dunchock . | |
| 4,773,709 | 9/1988 | Slinkard | 297/188.09 |
| 4,907,840 | 3/1990 | Hawkins | 297/188.09 |
| 4,913,318 | 4/1990 | Forrester | 297/188.1 X |

Primary Examiner—Milton Nelson, Jr.

[57] ABSTRACT

An extended cab truck storage seat is disclosed. The storage seat comprises a box of an essentially rigid material with a front wall and a rear wall and parallel side walls coupled at their side edges to the side edges of the front and rear walls. The box includes a lower wall coupled at its front, rear and side edges to the bottom edges of the front, rear and side walls. The front and rear walls have a recess extending upwardly from their lower edges about an essentially common axis of rotation. The lower wall has an intermediate extent coupled at the front and rear edges thereof to the peripheral edges of the recesses of the front and rear walls. The front, rear, side and bottom walls are fabricated of steel and define an open rectangular top at the top edges of the front, rear and side walls. A lid has peripheral front, rear and side edges adapted to overlie the upper edges of the front, rear and side walls of the box. A hinge pivotally couples the rear edge of the lid to the upper edge of the rear wall to allow the lid to move between a lower closed orientation for sealing the box and a raised open orientation for allowing access to the interior of the box.

2 Claims, 3 Drawing Sheets

EXTENDED CAB TRUCK STORAGE SEAT

BACKGROUND OF THE INVENTION

1. Field of the Invention

The present invention relates to a new and improved extended cab truck storage seat and, more particularly, pertains to providing additional storage space in the bed of a pickup truck while allowing the device to function as an additional seat.

2. Description of the Prior Art

The use of storage devices and seats and combinations thereof in various designs and configurations is known in the prior art. More specifically, storage devices and seats and combinations thereof in various designs and configurations heretofore devised and utilized for the purpose of providing storage space and seating capabilities through various methods and apparatuses are known to consist basically of familiar, expected, and obvious structural configurations, notwithstanding the myriad of designs encompassed by the crowded prior art which has been developed for the fulfillment of countless objectives and requirements.

The prior art discloses a large number of devices for providing additional storage space in the bed of a pickup truck while allowing the device to function as an additional seat. By way of example, U.S. Pat. No. 4,256,340 to Dunchock discloses a lockable storage compartment and seat for vehicles.

U.S. Pat. No. 4,270,790 to Curotto discloses a convertible seat and storage device for automobiles.

U.S. Pat. No. 4,942,993 to Delgado discloses a vehicle seat storage apparatus.

U.S. Pat. No. 5,249,724 to Green discloses an underseat storage container.

U.S. Patent Number DES. 249,672 to VanderWaal discloses a behind seat storage compartment for trucks and the like.

Lastly, U.S. Patent Number DES. 338,780 to Rance discloses a storage box for use behind the seat of a vehicle.

In this respect, the extended cab truck storage seat according to the present invention substantially departs from the conventional concepts and designs of the prior art, and in doing so provides an apparatus primarily developed for the purpose of providing additional storage space in the bed of a pickup truck while allowing the device to function as an additional seat.

Therefore, it can be appreciated that there exists a continuing need for a new and improved extended cab truck storage seat which can be used for providing additional storage space in the bed of a pickup truck while allowing the device to function as an additional seat. In this regard, the present invention substantially fulfills this need.

SUMMARY OF THE INVENTION

In view of the foregoing disadvantages inherent in the known types of storage devices and seats and combinations thereof in various designs and configurations now present in the prior art, the present invention provides an improved extended cab truck storage seat. As such, the general purpose of the present invention, which will be described subsequently in greater detail, is to provide a new and improved extended cab truck storage seat and methods which have all the advantages of the prior art and none of the disadvantages.

To attain this, the present invention essentially comprises a new and improved extended cab truck storage seat comprising, in combination, a box of an essentially rigid material comprising a front wall and a rear wall in a generally vertical orientation and parallel side walls in a generally vertical orientation coupled at their side edges to the side edges of the front and rear walls, the box including a lower generally horizontal wall in an essentially rectangular configuration coupled at its front, rear and side edges to the bottom edges of the front, rear and side walls, the front and rear walls having a generally arcuate recess extending upwardly from their lower edges about an essentially common axis of rotation, the lower wall having an upwardly extending arcuate intermediate extent coupled at the front and rear edges thereof to the peripheral edges of the recesses of the front and rear walls, the front, rear, side and bottom walls being fabricated of steel and defining an open rectangular top at the top edges of the front, rear and side walls; a lid in a generally rectangular configuration having peripheral front, rear and side edges adapted to overlie the upper edges of the front, rear and side walls of the box; a hinge pivotally coupling the rear edge of the lid to the upper edge of the rear wall to allow the lid to move between a lower closed orientation for sealing the box and a raised open orientation for allowing access to the interior of the box; a lock with a button extending through an aperture in the front wall of the box adjacent to the upper edge thereof having a finger pivotable in response to the depression of the button and, in association therewith, a locking finger with a horizontal surface extending downwardly from the lower surface of the lid adjacent to the finger to allow locking the lid in the lower orientation and unlocking the lid upon the depression of the button with the pivoting away of the finger; padding positionable upon the upper surface of the lower wall having laterally disposed rectangular sections and an arcuately shaped raised intermediate section therebetween resting over the raised intermediate portion of the bottom wall; and a covering for the upper and side surfaces of the lid including a foam layer and a fabric covering thereover.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved extended cab truck storage seat which has all the advantages of the prior art storage devices and seats and combinations thereof in various designs and configurations and none of the disadvantages.

It is another object of the present invention to provide a new and improved extended cab truck storage seat which may be easily and efficiently manufactured and marketed.

It is a further object of the present invention to provide a new and improved extended cab truck storage seat which is of a durable and reliable construction.

An even further object of the present invention is to provide a new and improved extended cab truck storage seat which is susceptible of a low cost of manufacture with regard to both materials and labor, and which accordingly is then susceptible of low prices of sale to the consuming public, thereby making such storage devices and seats and combinations thereof in various designs and configurations economically available to the buying public.

Still yet another object of the present invention is to provide a new and improved extended cab truck storage seat which provides in the apparatuses and methods of the prior art some of the advantages thereof, while simultaneously overcoming some of the disadvantages normally associated therewith.

Even still another object of the present invention is to provide additional storage space in the bed of a pickup truck while allowing the device to function as an additional seat.

Lastly, it is an object of the present invention to provide an extended cab truck storage seat. The storage seat comprises a box of an essentially rigid material with a front wall and a rear wall and parallel side walls coupled at their side edges to the side edges of the front and rear walls. The box includes a lower wall coupled at its front, rear and side edges to the bottom edges of the front, rear and side walls. The front and rear walls have a recess extending upwardly from their lower edges about an essentially common axis of rotation. The lower wall has an intermediate extent coupled at the front and rear edges thereof to the peripheral edges of the recesses of the front and rear walls. The front, rear, side and bottom walls are fabricated of steel and define an open rectangular top at the top edges of the front, rear and side walls. A lid has peripheral front, rear and side edges adapted to overlie the upper edges of the front, rear and side walls of the box. A hinge pivotally couples the rear edge of the lid to the upper edge of the rear wall to allow the lid to move between a lower closed orientation for sealing the box and a raised open orientation for allowing access to the interior of the box.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts throughout the various Figures.

DESCRIPTION OF THE PREFERRED EMBODIMENT

Figure 1:
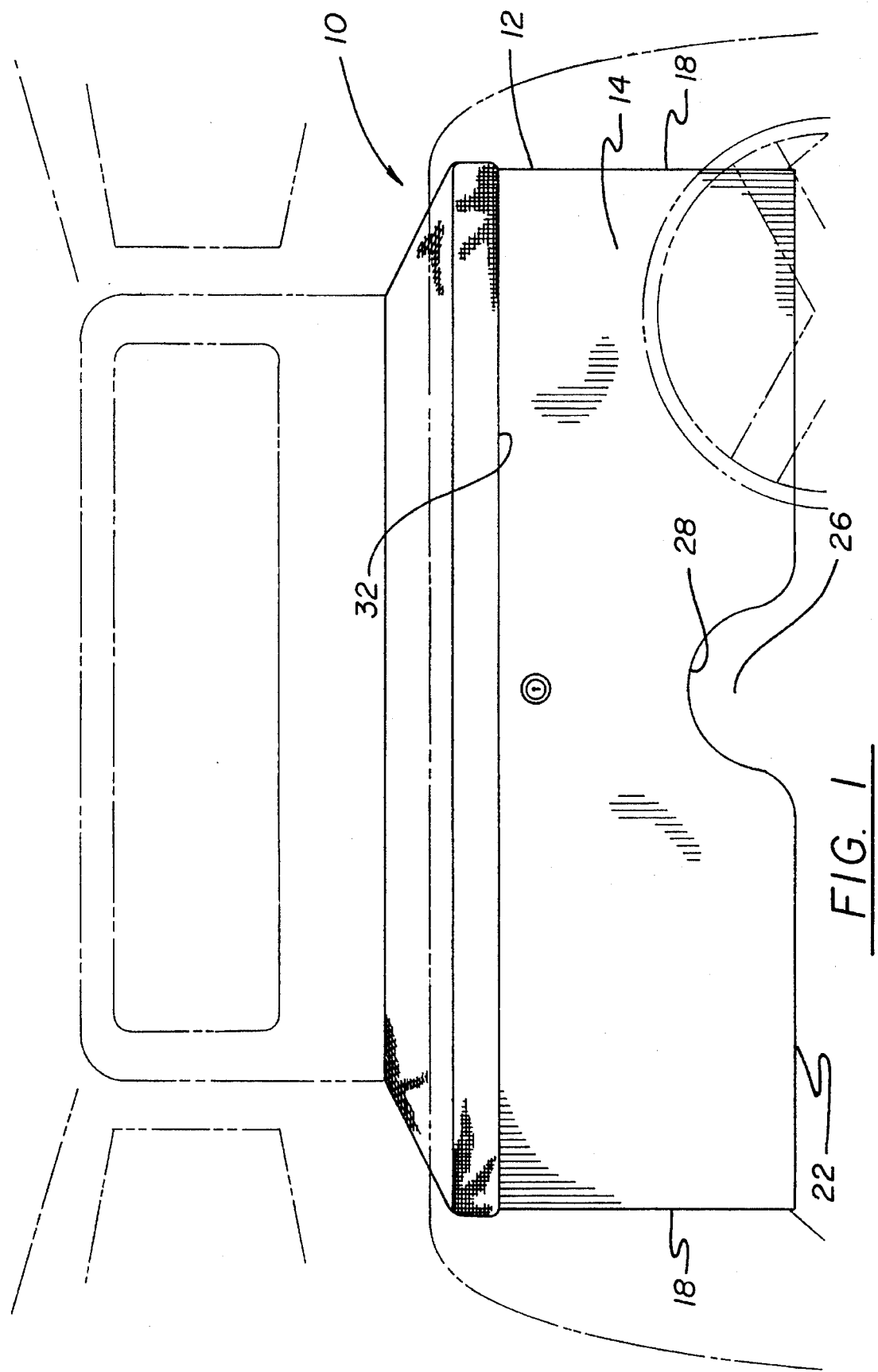
FIG. 1 is a perspective illustration taken from the rear of the preferred embodiment of the new and improved extended cab truck storage seat constructed in accordance with the principles of the present invention.
Figure 2:
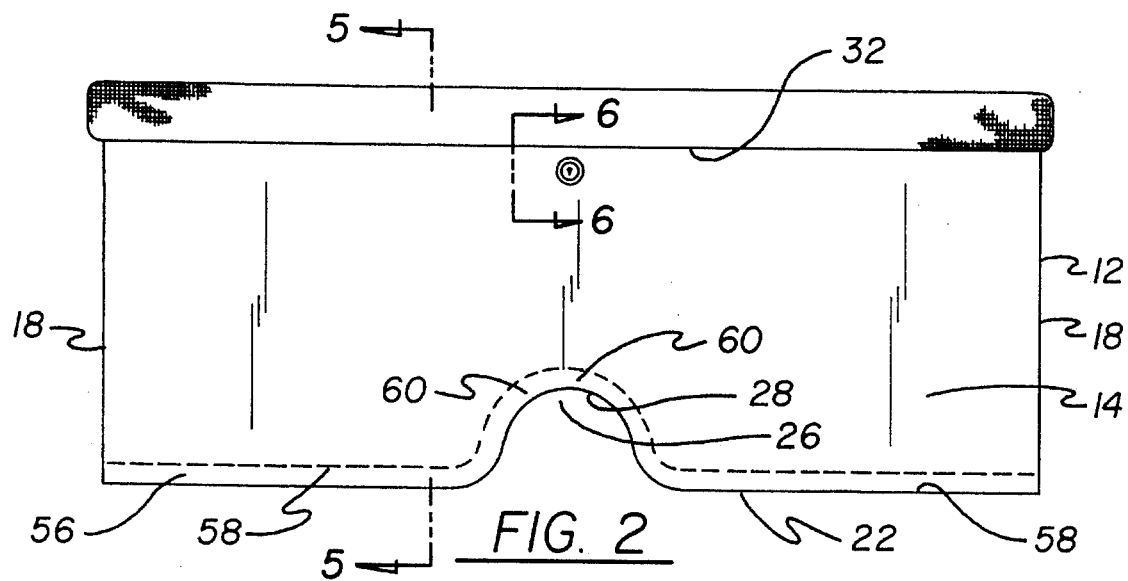
FIG. 2 is a rear elevational view of the device shown in FIG. 1.
Figure 3:
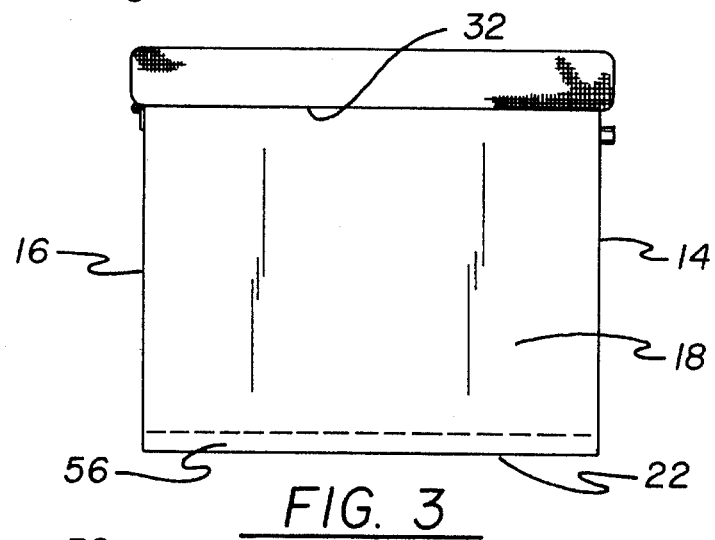
FIG. 3 is a side elevational view of the device shown in FIGS. 1 and 2.
Figure 4:
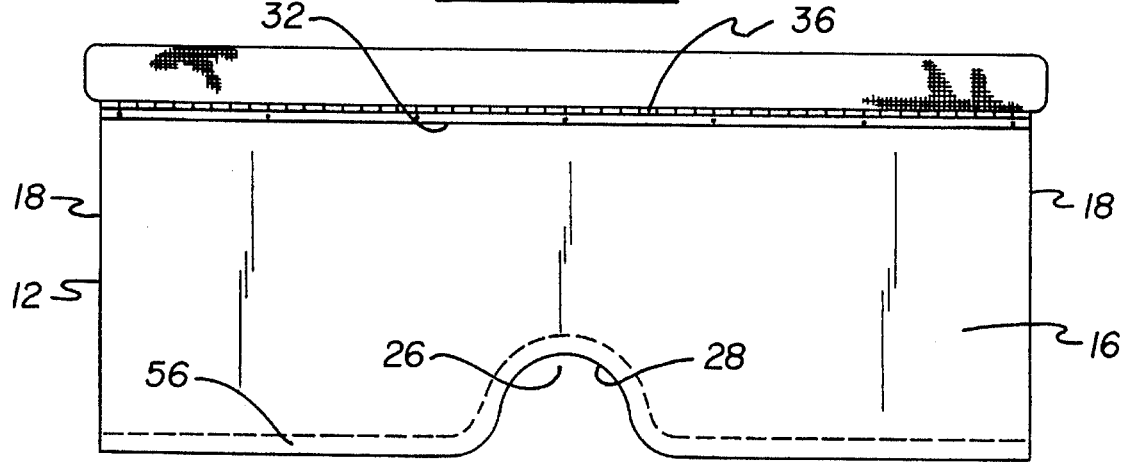
FIG. 4 is rear elevational view of the device shown in the prior Figures.
Figure 5:
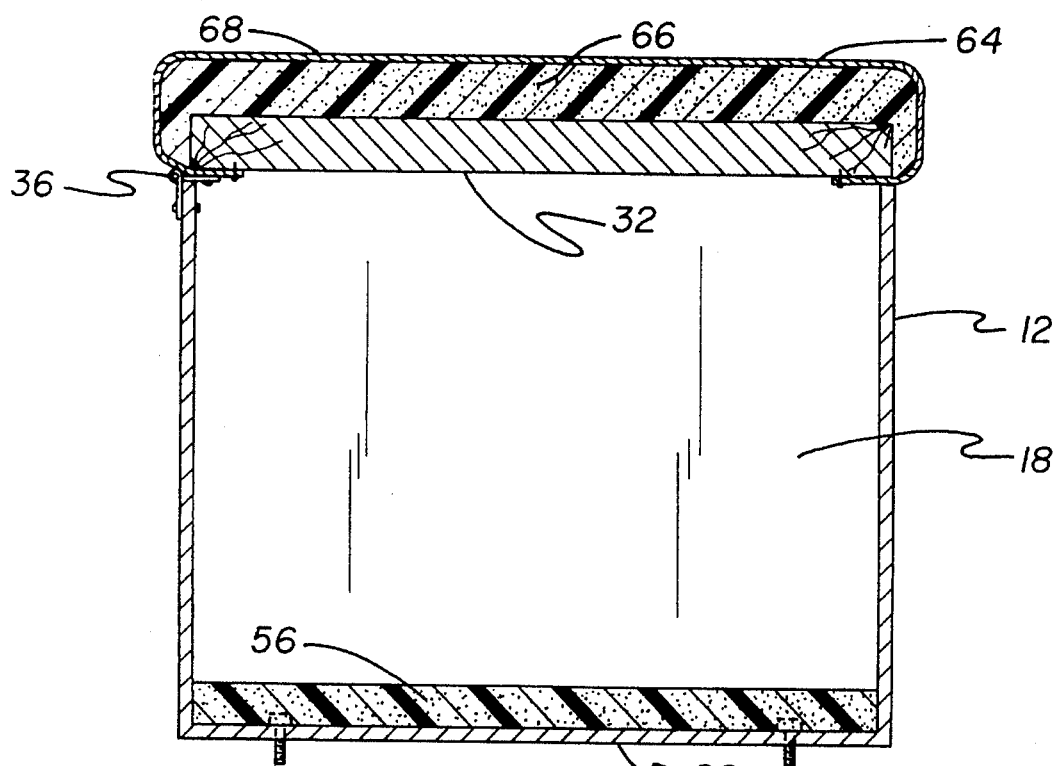
FIG. 5 is a cross-sectional view taken along line 5—5 of FIG. 2.
Figure 6:
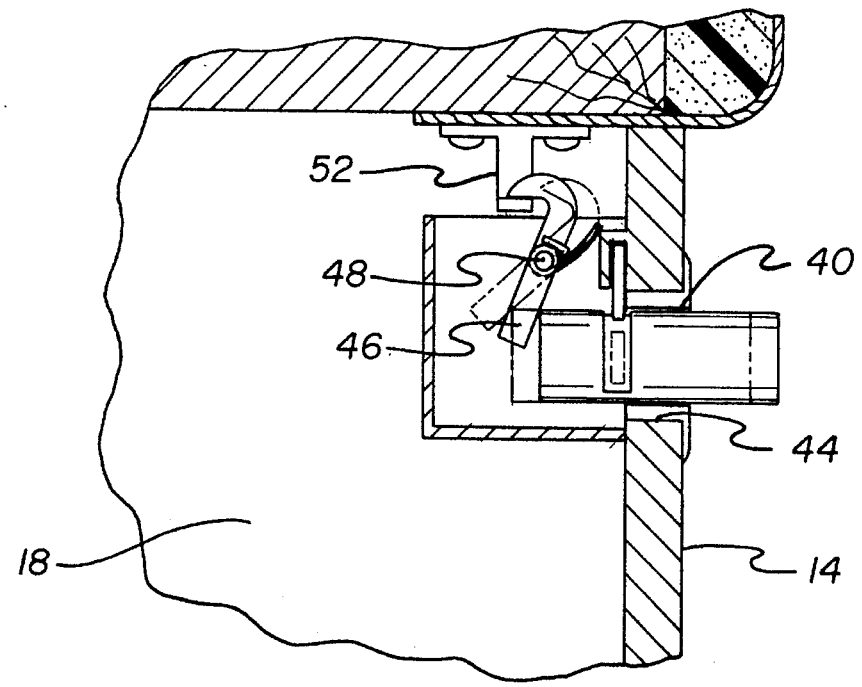
FIG. 6 a cross-sectional view taken along line 6—6 of FIG. 2.

With reference now to the drawings, and in particular to FIG. 1 thereof, the preferred embodiment of the new and improved extended cab truck storage seat embodying the principles and concepts of the present invention and generally designated by the reference numeral 10 will be described.

The present invention, the new and improved extended cab truck storage seat is a system 10 comprised of a plurality of components. In their broadest context, the components include a box, a lid, a hinge, a lock, padding and a covering. Each of the individual components is specifically configured and correlated one with respect to the other so as to attain the desired objectives.

The present invention is a system 10 which has as its central component a box 12. The box is fabricated of an essentially rigid material. It comprises a front wall 14 and a rear wall 16. Such front and rear walls are in a generally vertical orientation. In addition, the box has parallel side walls 18. Such side walls are also in a generally vertical orientation. The side walls are coupled at their side edges to the side edges of the front and rear walls.

The box also includes a lower horizontal wall 22 in a generally rectangular configuration. The lower wall is coupled at its front, rear and side edges to the bottom edges of the front, rear and side walls.

The front and rear walls are formed to have a generally arcuate recess 26 extending upwardly from their lower edges. Such arcuate recesses have an essentially common axis of rotation. The lower wall has an upwardly extending arcuate intermediate extent 28. Such intermediate extent is coupled at its front and rear edges to the peripheral edges of the recesses of the front and rear walls. The front, rear, side and bottom walls are preferably fabricated of a rigid material, preferably steel. The front, rear and side walls define an open rectangular top to the box at their top edges.

Next provided as part of the system 10 is a lid 32. The lid is in a generally rectangular configuration. It has peripheral front, rear and side edges adapted to overlie the upper edges of the front, rear and side walls of the box.

In association with the lid is hinge 36. The hinge pivotally couples the rear edge of the lid to the upper edge of the rear wall. This allows the lid to move between a lower closed orientation for sealing the box and a raised open orientation for allowing access to the interior of the box.

A lock 40 formed with an exposed button 42 is next provided as part of the system. The button extends through an aperture 44 in the front wall of the box. Such aperture is located adjacent to the upper edge of the front wall. The lock has a finger 46 pivotal about an axis 48. Pivoting is in response to the depression of the button.

In association with the lock, there is provided a locking finger 52. The locking finger has a horizontal surface extending downwardly from the lower surface of the lid adjacent to the button. This allows for locking the lid when in the lower orientation. It also allows unlocking of the lid upon the depression of the button with the associated pivoting away of the finger.

Greater utility is provided to the box of the present invention through the use of padding 56. The padding is preferably positioned upon the upper surface of the lower wall. It has laterally disposed rectangular sections 58. It also has an arcuately-shaped raised intermediate section 60 between the rectangular sections. The intermediate section is adapted to rest over the raised intermediate portion of the bottom wall.

Lastly provided as part of the system 10 is a covering 64. The covering is located on the upper inside surfaces of the lid. It is preferably fabricated of a foam layer 66 and a fabric covering 68 thereover. Such adds comfort to a person sitting thereon.

The present invention is a storage seat that replaces the factory rear seat supplied in extended cab trucks. This seat is shaped like a rectangular box and is mounted onto the truck floor where the original seat has been removed, as the steel sides include mounting brackets that match the attachments for the original seat. Covering the steel box is a plywood base onto which upholstery is adhered. A hinged lid on top opens upward toward the back of the truck to reveal the space where contents are stored, resting on the bottom, which is lined with 2 inch foam padding for cushioning. A push-button operated lock on the left side is secured with a key.

The present invention is installed in place of the original seat. Important contents that need to be transported in the box are stored and the box is locked with a key. Locking the vehicle door further adds security.

These storage seats could be produced in a variety of sizes to match all models of trucks, even smaller ones. The present invention not only keeps contents cushioned, it also keeps them out of sight to prevent tempting thieves. It is ideal for storing important and expensive items such as guns, fishing gear, tools, pull-out radios and the like. The present invention doesn't take up any more space than a regular seat, nor does it deprive a passenger of needed extra seating originally gained by purchasing an extended cab truck.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by LETTERS PATENT of the United States is as follows:

1. A new and improved extended cab truck storage seat comprising, in combination:

a box of an essentially rigid material comprising a front wall and a rear wall in a generally vertical orientation and parallel side walls in a generally vertical orientation coupled at their side edges to the side edges of the front and rear walls, the box including a lower generally horizontal wall in an essentially rectangular configuration coupled at its front, rear and side edges to the bottom edges of the front, rear and side walls, the front and rear walls having a generally arcuate recess extending upwardly from their lower edges about an essentially common axis of rotation, the lower wall having an upwardly extending arcuate intermediate extent coupled at the front and rear edges thereof to the peripheral edges of the recesses of the front and rear walls, the front, rear, side and lower walls being fabricated of steel and defining an open rectangular top at the top edges of the front, rear and side walls;

a lid in a generally rectangular configuration having peripheral front, rear and side edges adapted to overlie the upper edges of the front, rear and side walls of the box;

a hinge pivotally coupling the rear edge of the lid to the upper edge of the rear wall to allow the lid to move between a lower closed orientation for sealing the box and a raised open orientation for allowing access to the interior of the box;

a lock with a button extending through an aperture in the front wall of the box adjacent to the upper edge thereof having a finger pivotable in response to the depression of the button and, in association therewith, a locking finger with a horizontal surface extending downwardly from the lower surface of the lid adjacent to the finger to allow locking the lid in the lower orientation and unlocking the lid upon the depression of the button and pivoting away of the finger;

padding positionable upon the upper surface of the lower wall having laterally disposed rectangular sections and an arcuately shaped raised intermediate section therebetween resting over the raised intermediate extent of the lower wall; and a covering for the upper and side surfaces of the lid including a foam layer and a fabric covering thereover.

2. An extended cab truck storage seat comprising:

a box of an essentially rigid material comprising a front wall and a rear wall in a generally vertical orientation and parallel side walls in a generally vertical orientation coupled at their side edges to the side edges of the front and rear walls, the box including a lower generally horizontal wall in an essentially rectangular configuration coupled at its front, rear and side edges to the bottom edges of the front, rear and side walls, the front and rear walls having a generally arcuate recess extending upwardly from their lower edges about an essentially common axis of rotation, the lower wall having an upwardly extending arcuate intermediate extent coupled at the front and rear walls, the front, rear, side and lower walls being fabricated of steel and defining an open rectangular top at the top edges of the front, rear and side walls;

a lid in a generally rectangular configuration having peripheral front, rear and side edges adapted to overlie the upper edges of the front, rear and side walls of the box;

a hinge pivotally coupling the rear edge of the lid to the upper edge of the rear wall to allow the lid to move between a lower closed orientation for sealing the box and a raised open orientation for allowing access to the interior of the box; and padding positionable upon the upper surface of the lower wall having laterally disposed rectangular sections and an arcuately shaped raised intermediate section therebetween resting over the raised intermediate extent of the lower wall.

\* \* \* \* \*